United States Patent [19]

Maggioni

[11] 3,914,323

[45] Oct. 21, 1975

[54] PROCESS FOR PREPARING DIPHENOLS

[75] Inventor: Paolo Maggioni, Como, Italy

[73] Assignee: Brichima S.p.A., Milan, Italy

[22] Filed: Aug. 1, 1973

[21] Appl. No.: 384,416

[30] Foreign Application Priority Data

Aug. 18, 1972 Italy................................ 28265/72

[52] U.S. Cl. ............................................ 260/621 G
[51] Int. Cl.² ........................................... C07C 37/00
[58] Field of Search ................................ 260/621 G

[56] References Cited
UNITED STATES PATENTS

| | | | |
|---|---|---|---|
| 2,395,638 | 2/1946 | Milas | 260/621 G |
| 3,531,519 | 9/1970 | Parkin et al. | 260/621 G |
| 3,662,006 | 5/1972 | Massie et al. | 260/621 G |

*Primary Examiner*—Norman P. Morgenstern
*Attorney, Agent, or Firm*—Stevens, Davis, Miller & Mosher

[57] ABSTRACT

A process for preparing a mixture of pyrocatechin and hydroquinone by the hydroxylation of phenol with hydrogen peroxide, in which the phenol is reacted with hydrogen peroxide in the presence of a catalyst consisting essentially of a cobalt salt used in a quantity of less than 1% molar with respect to the phenol and at a pH of less than 5.

5 Claims, No Drawings

PROCESS FOR PREPARING DIPHENOLS

This invention relates to a new process for producing pyrocatechin and hydroquinone from phenol, with good overall yields and with a prevalence of pyrocatechin.

Pyrocatechin and hydroquinone are notably products of great interest in various sectors of the chemical industry. Because of this the problem of their synthetic production has been an object of study for many years, without however yet having found a completely satisfactory solution. The process of direct hydroxylation either by peracids (see for example French Pat. No. 1,479,354) or by a redox system consisting essentially of hydrogen peroxide and iron salts (see for example J.Prakt.Chem. 152.45 (1939); J.Chem.Soc. 97, 1966; J.Chem.Soc. 3265 (1957) ), has been particularly studied.

The processes with peracids known up to the present have however been delicate in practice and of difficult industrial realisation, mainly due to the aggressiveness of the organic acids, whereas the processes with hydrogen peroxide and iron salts have been unattainable industrially mainly due to the need to work in a very dilute solution and to the consequent difficulty of separating the useful products and the unconverted phenol from the reaction mixture. We have now found a new catalyst which, by operating under critical conditions of pH of the medium and of catalyst concentration, enables the direct hydroxylation of phenol to pyrocatechin and hydroquinone to be carried out industrially by means of hydrogen peroxide in a simple and economical manner.

The catalyst which characterises the process according to the invention consists of cobalt salts of organic and inorganic acids used in quantities of less than 1% molar with respect to the phenol and at a pH of less than 5. Under these conditions the process proceeds in an extremely controlled manner, without danger of explosion and with a minimum production of secondary products, even where carried out at high concentrations of the reagents in the reaction mixture and in particular with very concentrated hydrogen peroxide. Both these conditions (possibility of working with very concentrated solutions and high controllability of the reaction) lead in practice to easy separation of the final products, the separation of which has always constituted one of the critical points in this type of reaction.

The overall yields of pyrocatechin and hydroquinone are always very high and in general lie between 75 and 95%. The conversions of phenol are maintained between 3 and 30%.

The yields reduce gradually as the upper limit previously fixed for the catalyst (1% molar with respect to the phenol) is approached and then fall sharply when said limit is exceeded.

The preferred quantity of catalyst lies between 0.1 and 0.005% in moles relative to the phenol.

By operating at a pH of greater than 5, and hence outside the established critical limit, the reaction leads prevalently to the decomposition of the hydrogen peroxide with the formation only of minimum percentages of pyrocatechin and hydroquinone. The pH may be brought into the required range by the addition of a suitable quantity of a strong mineral acid.

As stated previously, the present process may be carried out using any cobalt salt as catalyst. However the results, both from the point of view of the yields and the reaction velocity, are not equally good for all cobalt salts.

We have however found, and this constitutes a further object of the invention, that even those cobalt salts which give too long reaction times and rather low yields can be brought to the optimum state for carrying out the process by activating them with very small quantities of iron salts, in a quantity of less than 1% molar relative to the cobalt salt. The same quantities of iron salts, used under the same working conditions and in the absence of cobalt salts, do not catalyse the hydroxylation of the phenol, even after long periods. Examples of cobalt salts useful as catalysts in the present process are: the sulphate, chloride, nitrate, acetate, acetylacetonate, oxalate and the like.

Example of iron salts which can be used as activators for the cobalt catalysts in the present process are: the sulphate, chloride, acetate, oxalate and the like.

In each case the process is carried out using a large excess of phenol over the hydrogen peroxide, preferably a ratio of between 2:1 and 30:1, and a phenol concentration in the reaction mixture of between 10 and 90%.

It is however clear that as the new process can be carried out at strong phenol concentrations, operation will preferably be at the hifh concentrations.

The reaction temperature lies between 0° and 150°C, preferably between 50° and 100°C.

The operation of the new process does not present any significant particularity as the reagents may be mixed in any order totally before the commencement of the reaction. This is in fact a characteristic of the process, in that only the extreme controllability and hence safety of the reaction in the presence of cobalt salts enables the entire hydrogen peroxide necessary for the process to be added to the phenol and catalyst in a single solution, the hydrogen peroxide being at concentrations which may lie between 30 and 60%.

We give hereinafter some examples which serve to better illustrate the essential points of the process according to the invention, without in any way limiting it.

EXAMPLE 1

75 ml of water, 94 g of phenol and 224 mg of $CoSO_4 \cdot 7H_2O$ are poured into a 250 ml flask provided with a thermometer, stirrer, filling funnel and cooler.

The pH of the mixture is adjusted to 3.2 by the addition of 1.8 cc of 0.1 N $H_2SO_4$ and the mixture is heated to 80°C. 11.32 g of 30% hydrogen peroxide are added to this solution. The reaction commences within a few minutes and is complete after 1 h and 20 minutes.

The reaction mixture is fractionally distilled and from it are separated phenol, pyrocatechin and hydroquinone. The overall yield of diphenols with respect to the phenol which has disappeared in 88%. The ratio of pyrocatechin to hydroquinone is 2:1.

The same results are obtained by using 59% $H_2O_2$.

EXAMPLE 2

30 ml of water, 94 g of phenol, and 196 mg of $CoCl_2 \cdot 6H_2O$ are poured into a 250 ml flask provided with a thermometer, stirrer, filling funnel and cooler. The pH of the solution is brought to 2.8 by HCl and the solution is heated to 60°C. 11.32 g of 30% hydrogen peroxide are then added. The reaction begins after a few minutes, after 5 hours 33% of the hydrogen peroxide supplied has reacted and after 17 hours the reaction has terminated.

The reaction mixture is fractionally distilled and from it are separated phenol, pyrocatechin and hydroquinone. The overall yield of diphenols with respect to the converted phenol is 75%. The ratio of pyrocatechin to hydroquinone is 2:1.

The same results are obtained with 59% $H_2O_2$.

EXAMPLE 3

The operation was the same as example 2, but in addition to the cobalt salt 0.455 mg of $FeCl_3.6H_2O$ was added to the phenol. The reaction commences immediately and is complete after 4 hours. The diphenol yield is 85%.

In the same example repeated in an identical manner but using only the iron salt in the absence of cobalt salts, the reaction had not yet commenced after 6 hours.

EXAMPLE 4

30 ml of water, 94 g of phenol, 196 mg of $CoCl_2.6H_2O$ and 1.36 mg of $FeCl_3.6H_2O$ were poured into a 250 ml flask provided with a thermometer, stirrer, filling funnel and cooler. The pH is adjusted with $H_2SO_4$ to 2.8 and the mixture is heated to 60°C. 11.32 g of 30% hydrogen peroxide are then added (the same results are obtained with 59% hydrogen peroxide).

The reaction commences instanteneously and after 30 minutes is practically finished.

Pyrocatechin and hydroquinone are separated from the reaction mixture by fractional distillation in quantities equivalent to a yeild of 80% relative to the converted phenol. The pyrocatechin:hydroquinone ratio is 2:1.

Operating under the same conditions but in absence of the cobalt salt, the reaction had not commenced after 1 hour and 30 minutes.

EXAMPLE 5

The process is carried out under the same conditions as in example 2, but the pH is adjusted to 2 and only 18.2 mg of $CoCl_2.6H_2O$ are used. The reaction is complete in 35 hours and the yield of diphenols relative to the converted phenol is 75%. The ratio of pyrocatechin to hydroquinone is 2.3:1.

EXAMPLE 6

The process is carried out as in example 2, but the reaction temperature is maintained at 80°C. bringing the initial pH of the reaction mixture to 2 and using 98 mg of $CoCl_2.6H_2O$. The reaction commences almost immediately; after 2 h 60% of the hydrogen peroxide has reacted and after 5 h the reaction is complete. The yield of diphenols relative to the converted phenol is 75%. The pyrocatechin:hydroquinone ratio is 2.3:1.

EXAMPLE 7

The process is carried out under the same conditions as in Example 2, but the initial pH of the mixture is adjusted to 3.4 with $HNO_3$ and instead of the cobalt chloride an equivalent quantity of cobalt nitrate is used.

The reaction temperature is maintained around 80°C. The reaction is complete in 5 h and the yield of diphenols is equal to 77% of the converted phenol.

The ratio of pyrocatechin to hydroquinone is 2:1.

EXAMPLE 8

The process is carried out under the same conditions as example 2, but the initial pH is adjusted to 3.1 with $H_2SO_4$ and the cobalt chloride is replaced with the equivalent quantity of cobalt acetate. The reaction temperature is maintained at 80°C. The reaction begins within a few minutes and is complete within 15 hours. The yield of diphenols is 75% relative to the phenol which has disappeared; the pyrocatechin:hydroquinone ratio is 2.3:1.

Operating in an identical manner to that described but without bringing the initial pH of the reaction mixture down below 5 (the pH of the reaction mixture is found to be 6.5) the hydrogen peroxide reacts rapidly, but when the reaction is finished only a minimum quantity of diphenols is found, less than 5% of the converted phenol.

What we claim is:

1. A process for preparing a mixture of pyrocatechin and hydroquinone by the hydroxylation of phenol with hydrogen peroxide, in which the phenol is reacted with hydrogen peroxide at a molar ratio of phenol:$H_2O_2$ of between 2:1 and 30:1 in the presence of a catalyst consisting essentially of a cobalt compound selected from the group consisting of the sulphate, chloride, nitrate, acetate, acetylacetonate wherein said cobalt compound is present in a quantity of less than 1% molar with respect to the phenol, wherein the process is conducted at a pH of less than 5 by addition of a strong mineral acid to the reaction mixture and wherein the reaction is conducted with a phenol concentration in the reaction mixture of between 10 and 90%.

2. A process as claimed in claim 1, in which the reaction is conducted at temperatures of between 0° and 150°C.

3. A process as claimed in claim 1, in which the conversion of the phenol is maintained between 3 and 30%.

4. A process as claimed in claim 1, in which the cobalt compound is used in the presence of quantities of less than 1% molar with respect to its weight of an iron salt selected from the group consisting of the ferric sulfate, ferrous sulfate, chloride, nitrate and oxylate.

5. A process as claimed in claim 1 in which the reaction is conducted at temperatures of between 50° and 100°C.

* * * * *